Aug. 2, 1927.  1,637,676
O. VON BOHUSZEWICZ ET AL
DEVICE FOR MEASURING THE FORCES ARISING DURING TURNING
ON LATHES AND THE LIKE
Filed Feb. 28, 1924
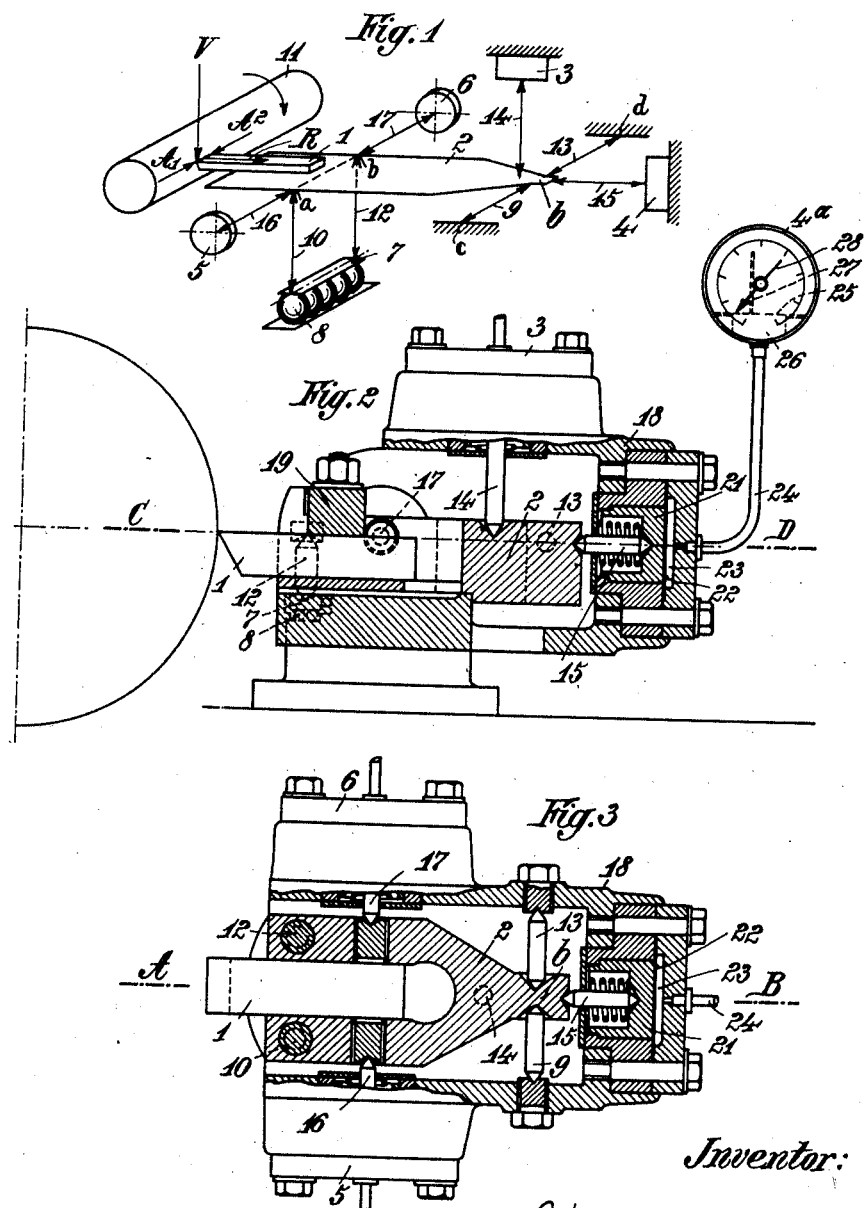
Inventor:
Oskar von Bohuszewicz and
Wilhelm Wilk
By Emil Bönnelycke
Attorney Patented Aug. 2, 1927.

1,637,676

UNITED STATES PATENT OFFICE.

OSKAR von BOHUSZEWICZ AND WILHELM WILK, OF DUSSELDORF, GERMANY.

DEVICE FOR MEASURING THE FORCES ARISING DURING TURNING ON LATHES AND THE LIKE.

Application filed February 28, 1924, Serial No. 695,816, and in Germany May 11, 1923.

Experience has shown that the mounting of measuring devices on the tool-holders of lathes and the like, especially those having low centres of the head and tail stocks, is connected with difficulties as regards the measuring instruments for vertical pressure. As a rule recourse is had either to an arrangement and combination of levers by which the pressure is transmitted in an appropriate manner, or by placing the measuring instrument for vertical pressure vertically above the point where the force acts.

Now, in our improved device the measuring instrument for vertical pressure is arranged not above the point where the force acts, but rearwards therefrom, in the direction of the lathe tool or turning tool, as shown, by way of example, in the accompanying drawing, in which our new arrangement and combination of parts is illustrated diagrammatically in Fig. 1. Fig. 2 is a vertical section through the support, taken on line A—B of Fig. 3, and Fig. 3 is a horizontal section on line C—D of Fig. 2.

The turning tool 1 which is supposed to be just acting on a rotating work-piece 11 is carried by one arm of a double-armed lever 2 which transmits the vertical pressure V to the measuring instrument 3 by an intermediate member 14. The lever 2 is supported by an axle $a$—$b$ on which it can oscillate.

As, however, also the radial pressure R which acts in the direction of the tool 1 shall be measured, the axle $a$ is supported by oscillating supporting rods 10 and 12 so that the tool can yield in the direction R, when the pressure acting in this direction will be transmitted to the measuring instrument 4.

The ratio in the lengths of the arms of the lever 2 may be so calculated that the generating of too great atmospheric pressure in the measuring instrument 3 is obviated.

In order to determine the axial pressure $A^1$—$A^2$ for which purpose the measuring instruments 5 and 6 are provided, the tool holder 2 is supported on the members 10 and 12 in such a manner that it may give way in the direction $A^1$—$A^2$, as well as reversely, and, besides, its rear end, that which is located near the measuring instrument 4, is stiffened by stays 9 and 13 relatively to walls of the frame of the device. Furthermore, the rods 10 and 12 are supported in their turn by a plate 7 or the like which rests on balls or rollers 8 so that friction is reduced practically to zero or nearly so.

Referring to Figs. 2 and 3, the tool holder 2 is arranged in a box-like support 18 and the tool is mounted therein by means of the clamp 19. The tool holder 2 is a two-armed lever which is supported at its axis of rotation by rods 10 and 12 which bear against a plate 7. The measuring instrument 3 transmits by means of a rod 14 the vertical pressure V created by the edge of the turning tool 1. This plate rests on a plurality of balls 8 arranged in the support 18. The free end of the holder is supported by means of rods 9 and 13 which are arranged against the sides of the support 18. The radial pressure R is measured by the instrument at the end of the support 18 by means of the rod 15 and the axial pressures $A^1$ and $A^2$ are measured by the instruments 6 and 5 at the sides of the support 18 by means of rods 17 and 16.

The rod 15, when moved by the holder 2, operates, in known manner, a spring-pressed piston 21 which presses against a membrane 22. This membrane closes a chamber 23 and the instrument 4 is, in known manner, connected to a manometer $4^a$ by means of pipe 24. This manometer comprises a membrane 25 which closes the pressure chamber 26. It can easily be seen that a movement of the membrane 22 will move the membrane 25, by means of the fluid in the chambers 23 and 26 and in the pipe 24, which in turn operates the toothed rod 27 mounted thereon. This rod 27 meshes with a gear secured to the pointer 28.

We claim:

1. A device for measuring the forces generated during rotation on lathes comprising in combination, a lever adapted for use as a tool holder; rods adapted to carry said lever; a plurality of balls supporting said rods; measuring instruments associated with said tool holder; and means for transmitting the forces to the instruments.

2. A device for measuring the forces generated during rotation on lathes comprising in combination, a tool holder; rods adapted to carry said holder; measuring instruments associated with said tool holder; and means for transmitting the forces to the instruments.

3. A device for measuring the forces generated during rotation on lathes comprising in combination a tool holder; a measuring instrument for said holder and adapted to measure the vertical pressure exerted on a tool held in said holder; and means for transmitting said pressure from the tool holder to the instrument.

4. A device for measuring the forces generated during rotation on lathes comprising a holder adapted to support a lathe tool; a measuring instrument arranged at the rear of said holder and adapted to measure the vertical pressure exerted on a tool held in said holder; and means for transmitting the forces from the tool holder to the instrument.

5. A device for measuring the forces of lathe tools during operation on the work, comprising a lever adapted to support a lathe tool; means for supporting said lever to permit transmission of the axial, radial and vertical pressures arising from the tool operating on the work; and means for measuring said pressures.

6. A device for measuring the forces of lathe tools during operation on the work, comprising a lever adapted to support a lathe tool; means for supporting said lever to permit transmission of the axial, radial and vertical pressures arising from the tool operating on the work; and separate means for measuring each of said pressures.

7. A device for measuring the forces of lathe tools during operation on the work, comprising a lever adapted to support a lathe tool; a plurality of rods for supporting said lever to permit transmission of the axial, radial and vertical pressures arising from the tool operating on the work; and separate means for measuring each of said pressures.

8. A device for measuring the forces of lathe tools during operation on the work, comprising a lever adapted to support a lathe tool; means for supporting said lever to permit transmission of the axial, radial and vertical pressures arising from the tool operating on the work; and a measuring instrument for measuring each of said pressures.

9. A device for measuring the forces of lathe tools during operation on the work, comprising a lever adapted to support a lathe tool; a plurality of balls; means for supporting said lever on said balls to permit transmission of the radial, axial and vertical pressures arising from the tool operating on the work; and a measuring instrument for measuring each of said pressures.

10. A device for measuring the forces of lathe tools during operation on the work comprising a lever adapted to support a lathe tool; means for mounting said lever in relation to the work to permit the reception and transmission of the axial, radial and vertical pressures arising from the tool operating on the work; means for receiving and transmitting said pressures from the lever; and means associated with said last-named means for receiving and measuring said pressures.

In testimony whereof we have affixed our signatures.

OSKAR von BOHUSZEWICZ,
Dr. Ing. WILHELM WILK.